US008819640B2

(12) United States Patent
Bates et al.

(10) Patent No.: US 8,819,640 B2
(45) Date of Patent: Aug. 26, 2014

(54) ESTABLISHING CLOUD DEBUG BREAKPOINTS ASSIGNED TO USERS

(75) Inventors: Cary L. Bates, Rochester, MN (US); Kershaw S. Mehta, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 85 days.

(21) Appl. No.: 13/556,262

(22) Filed: Jul. 24, 2012

(65) Prior Publication Data

US 2014/0033180 A1 Jan. 30, 2014

(51) Int. Cl.
*G06F 9/44* (2006.01)
*G06F 11/36* (2006.01)

(52) U.S. Cl.
CPC .................... *G06F 11/362* (2013.01)
USPC ........................................................ 717/127

(58) Field of Classification Search
CPC .................................................. G06F 11/362
USPC ........................................................ 717/129
See application file for complete search history.

(56) References Cited

U.S. PATENT DOCUMENTS

| 6,658,650 | B1 * | 12/2003 | Bates ............................ 717/127 |
| 8,572,575 | B2 * | 10/2013 | Berlyant et al. .............. 717/126 |
| 2003/0023955 | A1 * | 1/2003 | Bates et al. ................... 717/129 |
| 2011/0258614 | A1 * | 10/2011 | Tamm ........................... 717/129 |
| 2012/0131555 | A1 * | 5/2012 | Hossain et al. ............... 717/124 |
| 2012/0151452 | A1 * | 6/2012 | Zinkovsky et al. .......... 717/129 |
| 2013/0007716 | A1 * | 1/2013 | Bates ............................ 717/125 |
| 2013/0219363 | A1 * | 8/2013 | Wu et al. ...................... 717/124 |

OTHER PUBLICATIONS

J. Rousaud-Cornabas, "A Trust Aware Distributed and Collaborative Scheduler for Virtual Machines in Cloud", Laboratoire d'Informatique Fondamentale d'Orleans, Universite d'Orleans, France, May 11, 2011, pp. 1-34.

* cited by examiner

*Primary Examiner* — Qing Chen
*Assistant Examiner* — Clint A Thatcher
(74) *Attorney, Agent, or Firm* — Owen J. Gamon; Roy W. Truelson

(57) ABSTRACT

In an embodiment, a cloud debug breakpoint, assigned to a first user, is established in a program at a first server in a cloud, wherein the first user selects the first server at which the program executes, from among servers in the cloud. The program at the servers in the cloud is executed, in response to requests from users. The program at the first server in the cloud is executed, in response to all requests from the first user to the program. If an identifier of a user that sent a request that the program was executing at a time that execution of the program at the first server reaches the cloud debug breakpoint matches an identifier of the first user assigned to the cloud debug breakpoint, the execution of the program is halted and control of a processor is given to a debugger.

18 Claims, 6 Drawing Sheets

CLOUD DEBUG TABLE (156)

| USER ID (310) | PROGRAM ID (312) | INSTRUCTION ADDRESS (314) | SWAPPED INSTRUCTION (316) | DEBUGGER EXIT ID (318) | |
|---|---|---|---|---|---|
| USER A | PROGRAM A | 213A | LOAD R1, A | DEBUGGER A | 302 |
| USER B | PROGRAM B | 0045 | STORE R1, A | DEBUGGER B | 304 |

FIG. 3

PROGRAM TABLE (160)

| USER ID (410) | PROGRAM ID (412) | SERVER ID (414) | |
|---|---|---|---|
| USER A | PROGRAM A | SERVER A | 402 |
| USER B | PROGRAM B | SERVER B | 404 |
| USER B | PROGRAM A | SERVER A | 406 |
| USER B | PROGRAM A | SERVER B | 408 |

FIG. 4

ESTABLISHING CLOUD DEBUG BREAKPOINTS ASSIGNED TO USERS

FIELD

An embodiment of the invention generally relates to computer systems and more particularly to breakpoints in programs that execute on computers in a cloud.

BACKGROUND

Computer systems typically comprise a combination of computer programs and hardware, such as semiconductors, transistors, chips, circuit boards, storage devices, and processors. The computer programs are stored in the storage devices and are executed by the processors. Locating, analyzing, and correcting suspected faults in a computer program is a process known as "debugging." Bugs are problems, faults, or errors in a computer program. Typically, a programmer uses another computer program commonly known as a debugger to debug the program under development.

Conventional debuggers typically support three primary types of operations, which a computer programmer may request via a user interface. A first type is a breakpoint or address watch operation, which permits a programmer to identify with a breakpoint a precise instruction at which to halt execution of the program by the processor, or identify via an address watch, a memory location for the processor to monitor for content modification, at which time the program's execution is halted. The debugger may set a breakpoint by replacing a valid instruction at the location specified by the programmer with an invalid instruction or a supervisor instruction, which causes a system exception when the program attempts to execute the invalid instruction or the supervisor instruction, giving control of the processor to the debugger. The debugger may set an address watch via a function of the processor. As a result, when a program is executed by the debugger, the program executes on the processor in a normal fashion until the breakpoint is reached or the contents of the monitored memory location are written to, at which time the debugger halts execution of the program. A second type is a step operation, which permits a computer programmer to cause the processor to execute instructions in a program either one-by-one or in groups. After each instruction or group of instructions are executed, the debugger then halts execution of the program. Once the execution of the program is halted, either by step or breakpoint operations, conventional debuggers provide a third type of operation, which displays the content that is stored at various storage locations, in response to requests by the programmer. By this debugging process of halting the program at various instructions and examining the content of various storage locations, the programmer might eventually find the storage location whose stored content, such as an instruction or data, is incorrect or unexpected.

SUMMARY

A method, computer-readable storage medium, and computer system are provided. In an embodiment, a cloud debug breakpoint, assigned to a first user, is established in a program at a first server in a cloud, wherein the first user selects the first server at which the program executes, from among a plurality of servers in the cloud. The program at the plurality of servers in the cloud is executed, in response to a plurality of requests from a plurality of users. The program at the first server in the cloud is executed, in response to all requests from the first user to the program, wherein the first user is a member of the plurality of users, and wherein the first server is a member of the plurality of servers in the cloud. If an identifier of a user that sent a request that the program was executing at a time that execution of the program at the first server reaches the cloud debug breakpoint matches an identifier of the first user assigned to the cloud debug breakpoint, the execution of the program is halted and control of a processor on which the program executed is given to a debugger.

BRIEF DESCRIPTION OF THE SEVERAL VIEWS OF THE DRAWINGS

FIG. 3 depicts a block diagram of an example data structure for a cloud debug table, according to an embodiment of the invention.

FIG. 4 depicts a block diagram of an example data structure for a program table, according to an embodiment of the invention.

It is to be noted, however, that the appended drawings illustrate only example embodiments of the invention, and are therefore not considered a limitation of the scope of other embodiments of the invention.

DETAILED DESCRIPTION

Figure 1:
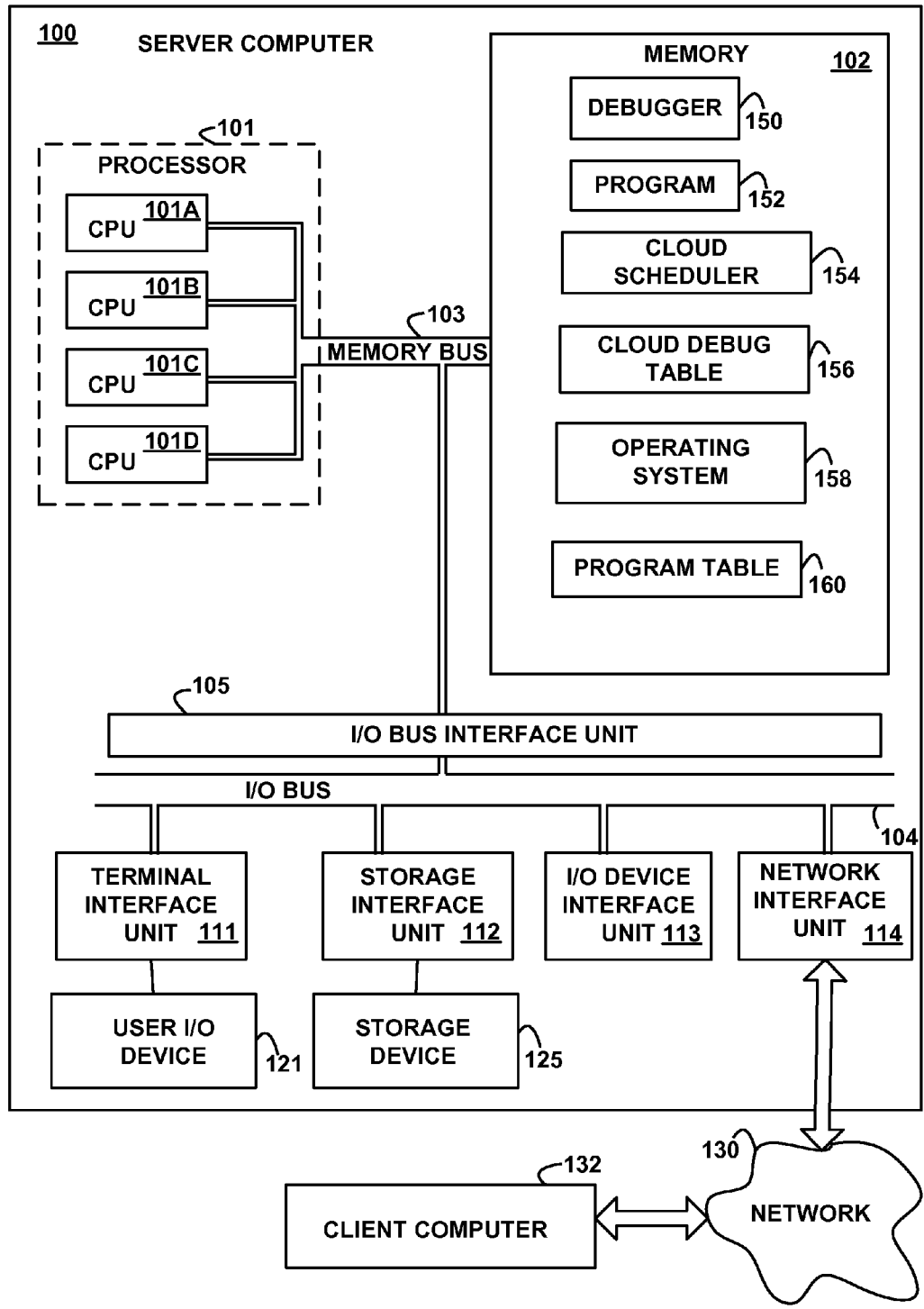
FIG. 1 depicts a high-level block diagram of an example system for implementing an embodiment of the invention.

Referring to the Drawings, wherein like numbers denote like parts throughout the several views, FIG. 1 depicts a high-level block diagram representation of a server computer system 100 connected to a client computer system 132 via a network 130, according to an embodiment of the present invention. The terms "server" and "client" are used herein for convenience only, and in various embodiments a computer system that operates as a client computer in one environment may operate as a server computer in another environment, and vice versa. The mechanisms and apparatus of embodiments of the present invention apply equally to any appropriate computing system.

The major components of the server computer system 100 comprise one or more processors 101, a main memory 102, a terminal interface unit 111, a storage interface unit 112, an I/O (Input/Output) device interface unit 113, and a network interface unit 114, all of which are communicatively coupled, directly or indirectly, for inter-component communication via a memory bus 103, an I/O bus 104, and an I/O bus interface unit 105.

The server computer system 100 contains one or more general-purpose programmable central processing units (CPUs) 101A, 101B, 101C, and 101D, herein generically referred to as the processor 101. In an embodiment, the server computer system 100 contains multiple processors typical of a relatively large system; however, in another embodiment the server computer system 100 may alternatively be a single CPU system. Each processor 101 executes instructions stored in the main memory 102 and may comprise one or more levels of on-board cache.

In an embodiment, the main memory 102 may comprise a random-access semiconductor memory, storage device, or storage medium (either volatile or non-volatile) for storing or encoding data and programs. In another embodiment, the main memory 102 represents the entire virtual memory of the server computer system 100, and may also include the virtual memory of other computer systems coupled to the server computer system 100 or connected via the network 130. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The main memory 102 stores or encodes a debugger 150, a program 152, a cloud scheduler 154, a cloud debug table 156, an operating system 158, and a program table 160. Although the debugger 150, the program 152, the cloud scheduler 154, the cloud debug table 156, the operating system 158, and the program table 160 are illustrated as being contained within the memory 102 in the server computer system 100, in other embodiments some or all of them may be on different computer systems and may be accessed remotely, e.g., via the network 130. The server computer system 100 may use virtual addressing mechanisms that allow the programs of the server computer system 100 to behave as if they only have access to a large, single storage entity instead of access to multiple, smaller storage entities. Thus, while the debugger 150, the program 152, the cloud scheduler 154, the cloud debug table 156, the operating system 158, and the program table 160 are illustrated as being contained within the main memory 102, these elements are not necessarily all completely contained in the same storage device at the same time. Further, although the debugger 150, the program 152, the cloud scheduler 154, the cloud debug table 156, the operating system 158, and the program table 160 are illustrated as being separate entities, in other embodiments some of them, portions of some of them, or all of them may be packaged together.

In an embodiment, the debugger 150, the program 152, the cloud scheduler 154, and the operating system 158 comprise instructions or statements that execute on the processor 101 or instructions or statements that are interpreted by instructions or statements that execute on the processor 101, to carry out the functions as further described below with reference to FIGS. 2, 3, 4, 5, 6, and 7. In an embodiment, the debugger 150, the program 152, the cloud scheduler 154, and the operating system 158 are implemented in hardware via semiconductor devices, chips, field programmable gate arrays, logical gates, circuits, circuit cards, and/or other physical hardware devices in lieu of, or in addition to, a processor-based system. In an embodiment, the debugger 150, the program 152, the cloud scheduler 154, and the operating system 158 comprise data in addition to instructions or statements.

The memory bus 103 provides a data communication path for transferring data among the processor 101, the main memory 102, and the I/O bus interface unit 105. The I/O bus interface unit 150 is further coupled to the I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the I/O bus 104.

The I/O interface units support communication with a variety of storage and I/O devices. For example, the terminal interface unit 111 supports the attachment of one or more user I/O devices 121, which may comprise user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 121 and the server computer system 100, and may receive output data via the user output devices. For example, a user interface may be presented via the user I/O device 121, such as displayed on a display device, played via a speaker, or printed via a printer.

The storage interface unit 112 supports the attachment of one or more disk drives or direct access storage devices 125 (which are typically rotating magnetic disk drive storage devices, although they could alternatively be other storage devices, including arrays of disk drives configured to appear as a single large storage device to a host computer). In another embodiment, the storage device 125 may be implemented via any type of secondary storage device. The contents of the main memory 102, or any portion thereof, may be stored to and retrieved from the storage device 125, as needed. The I/O device interface unit 113 provides an interface to any of various other input/output devices or devices of other types, such as printers or fax machines. The network interface unit 114 provides one or more communications paths from the server computer system 100 to other digital devices and the client computer systems 132; such paths may comprise, e.g., one or more networks 130.

Although the memory bus 103 is shown in FIG. 1 as a relatively simple, single bus structure providing a direct communication path among the processors 101, the main memory 102, and the I/O bus interface unit 150, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 150 and the I/O bus 104 are shown as single respective units, the server computer system 100 may, in fact, contain multiple I/O bus interface units 105 and/or multiple I/O buses 104. While multiple I/O interface units are shown, which separate the I/O bus 104 from various communications paths running to the various I/O devices, in other embodiments some or all of the I/O devices are connected directly to one or more system I/O buses.

In various embodiments, the server computer system 100 is a multi-user mainframe computer system, a single-user system, or a server computer or similar device that has little or no direct user interface, but receives requests from other computer systems (clients). In other embodiments, the server computer system 100 is implemented as a desktop computer, portable computer, laptop or notebook computer, tablet computer, pocket computer, telephone, smart phone, pager, automobile, teleconferencing system, appliance, or any other appropriate type of electronic device.

The network 130 may be any suitable network or combination of networks and may support any appropriate protocol suitable for communication of data and/or code to/from the server computer system 100 and the computer system 132. In various embodiments, the network 130 may represent a storage device or a combination of storage devices, either connected directly or indirectly to the server computer system 100. In another embodiment, the network 130 may support wireless communications. In another embodiment, the network 130 may support hard-wired communications, such as a telephone line or cable. In another embodiment, the network 130 may be the Internet and may support IP (Internet Protocol). In another embodiment, the network 130 is implemented as a local area network (LAN) or a wide area network (WAN). In another embodiment, the network 130 is implemented as a hotspot service provider network. In another embodiment, the network 130 is implemented an intranet. In another embodiment, the network 130 is implemented as any appropriate cellular data network, cell-based radio network technology, or wireless network. In another embodiment, the network 130 is implemented as any suitable network or combination of networks. Although one network 130 is shown, in other embodiments any number of networks (of the same or different types) may be present.

The computer system 132 may comprise some or all of the hardware and/or computer program elements of the server computer system 100.

FIG. 1 is intended to depict the representative major components of the server computer system 100, the network 130, and the client computer system 132. But, individual components may have greater complexity than represented in FIG. 1, components other than or in addition to those shown in FIG. 1 may be present, and the number, type, and configuration of such components may vary. Several particular examples of such additional complexity or additional variations are disclosed herein; these are by way of example only and are not necessarily the only such variations. The various program components illustrated in FIG. 1 and implementing various embodiments of the invention may be implemented in a number of manners, including using various computer applications, routines, components, programs, objects, modules, data structures, etc., and are referred to hereinafter as "computer programs," or simply "programs."

The computer programs comprise one or more instructions or statements that are resident at various times in various memory and storage devices in the server computer system 100 and that, when read and executed by one or more processors in the server computer system 100 or when interpreted by instructions that are executed by one or more processors, cause the server computer system 100 to perform the actions necessary to execute steps or elements comprising the various aspects of embodiments of the invention. Aspects of embodiments of the invention may be embodied as a system, method, or computer program product. Accordingly, aspects of embodiments of the invention may take the form of an entirely hardware embodiment, an entirely program embodiment (including firmware, resident programs, micro-code, etc., which are stored in a storage device) or an embodiment combining program and hardware aspects that may all generally be referred to herein as a "circuit," "module," or "system." Further, embodiments of the invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium, may be, for example, but not limited to, an electronic, magnetic, optical, electromagnetic, infrared, or semiconductor system, apparatus, or device, or any suitable combination of the foregoing. More specific examples (an non-exhaustive list) of the computer-readable storage media may comprise: an electrical connection having one or more wires, a portable computer diskette, a hard disk (e.g., the storage device 125), a random access memory (RAM) (e.g., the memory 102), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

A computer-readable signal medium may comprise a propagated data signal with computer-readable program code embodied thereon, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagates, or transports a program for use by, or in connection with, an instruction execution system, apparatus, or device. Program code embodied on a computer-readable medium may be transmitted using any appropriate medium, including but not limited to, wireless, wire line, optical fiber cable, Radio Frequency, or any suitable combination of the foregoing.

Computer program code for carrying out operations for aspects of embodiments of the present invention may be written in any combination of one or more programming languages, including object oriented programming languages and conventional procedural programming languages. The program code may execute entirely on the user's computer, partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments of the invention are described below with reference to flowchart illustrations and/or block diagrams of methods, apparatus (systems), and computer program products. Each block of the flowchart illustrations and/or block diagrams, and combinations of blocks in the flowchart illustrations and/or block diagrams may be implemented by computer program instructions embodied in a computer-readable medium. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified by the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture, including instructions that implement the function/act specified by the flowchart and/or block diagram block or blocks.

The computer programs defining the functions of various embodiments of the invention may be delivered to a computer system via a variety of tangible computer-readable storage media that may be operatively or communicatively connected (directly or indirectly) to the processor or processors. The computer program instructions may also be loaded onto a computer, other programmable data processing apparatus, or other devices to cause a series of operational steps to be performed on the computer, other programmable apparatus, or other devices to produce a computer-implemented process, such that the instructions, which execute on the computer or other programmable apparatus, provide processes for implementing the functions/acts specified in the flowcharts and/or block diagram block or blocks.

The flowchart and the block diagrams in the figures illustrate the architecture, functionality, and operation of possible implementations of systems, methods, and computer program products, according to various embodiments of the present invention. In this regard, each block in the flowcharts or block diagrams may represent a module, segment, or portion of code, which comprises one or more executable instructions for implementing the specified logical function (s). In some embodiments, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flow chart illustrations, can be implemented by special purpose hardware-based systems that perform the specified functions or acts, in combinations of special purpose hardware and computer instructions.

Embodiments of the invention may also be delivered as part of a service engagement with a client corporation, non-profit organization, government entity, or internal organizational structure. Aspects of these embodiments may comprise configuring a computer system to perform, and deploying computing services (e.g., computer-readable code, hardware, and web services) that implement, some or all of the methods described herein. Aspects of these embodiments may also comprise analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems. In addition, various programs described hereinafter may be identified based upon the application for which they are implemented in a specific embodiment of the invention. But, any particular program nomenclature that follows is used merely for convenience, and thus embodiments of the invention are not limited to use solely in any specific application identified and/or implied by such nomenclature. The exemplary environments illustrated in FIG. 1 are not intended to limit the present invention. Indeed, other alternative hardware and/or program environments may be used without departing from the scope of embodiments of the invention.

Figure 2:
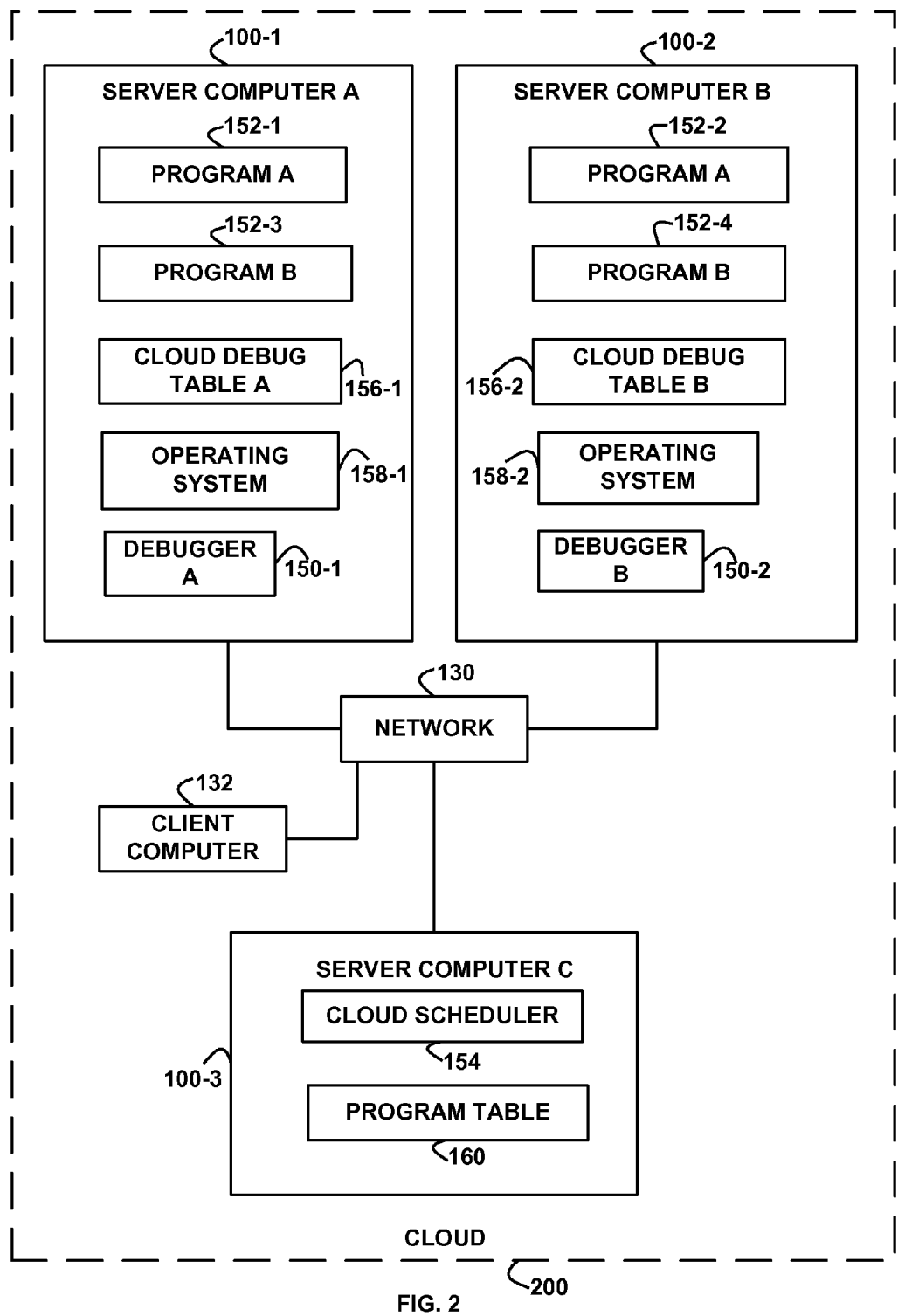
FIG. 2 depicts a block diagram of an example cloud, according to an embodiment of the invention.

FIG. 2 depicts a block diagram of an example cloud 200, according to an embodiment of the invention. The cloud 200 comprises the server computer system A 100-1, the server computer system B 100-2, the server computer system C 100-3, and the client computer system 132, connected via the network 130, according to an embodiment of the invention. The server computer systems 100-1, 100-2, and 100-3 are examples of, and are generically referred to by, the server computer system 100 (FIG. 1).

Referring again to FIG. 2, the server computer system A 100-1 and the server computer system B 100-2 comprise respective versions of the program A 152-1 and 152-2, respective versions of the program B 152-3 and 152-4, the respective cloud debug table A 156-1 and the cloud debug table B156-2, and respective operating system 158-1 and 158-2, the respective debugger A 150-1 and the debugger B 150-2. The program A 152-1, the program A 152-2, the program B 152-3, and the program B 152-4 are examples of, and are generically referred to by the program 152 (FIG. 1). In various embodiments, some of the program A 152-1, the program A 152-2, the program B 152-3, and the program B 152-4 may have breakpoints set and may contain supervisor or invalid instructions at the location of the breakpoints within the program 152 while other of the programs may not have breakpoints set and do not contain supervisor or invalid instructions at those locations or may have breakpoints set and may contain supervisor instructions or invalid instructions at other locations. The same or different users may request that the program A 152-1, the program A 152-2, the program B 152-3, and the program B 152-4 execute.

The cloud debug table 156-1 and the cloud debug table 156-2 are examples of, and are generically referred to by, the cloud debug table 156 (FIG. 1). The cloud debug table 156-1 and the cloud debug table 156-2 may contain the same or different data from each other, and the data in the cloud debug table 156-1 reflects and identifies the cloud debug breakpoints set (if any) in the program A 152-1 and the program B 152-3, and the data in the cloud debug table 156-2 reflects and identifies the cloud debug breakpoints set (if any) in the program A 152-2 and the program B 152-4. The operating system 158-1 and the operating system 158-2 are examples of, and are generically referred to by, the operating system 158 (FIG. 1). The debugger A 150-1 and the debugger B 150-2 are examples of, and are generically referred to by, the debugger 150 (FIG. 1).

The server computer C 100-3 comprises the cloud scheduler 154 and the program table 160. In other embodiments, the cloud scheduler 154 and the program table 160 may be stored on either of the server computer A 100-1 or the server computer B 100-2. The cloud scheduler 154 schedules the execution of the program A 152-1, the program A 152-2, the program B 152-3, and the program B 152-4 on the server computer A 100-1 and the server B 100-2 using the program table 160.

FIG. 3 depicts a block diagram of an example data structure for a cloud debug table 156, according to an embodiment of the invention. The cloud debug table 156 comprises example entries 302 and 304, each of which comprises an example user identifier (ID) field 310, a program identifier (ID) field 312, an instruction address field 314, a swapped instruction field 316, and a debugger exit identifier (ID) field 318.

The user identifier field 310, in each entry, specifies a user who has requested via the client computer system 132 that the cloud debug breakpoint represented by the respective entry be set. The program identifier field 312, in each entry, specifies an identifier of the program, such as one of the programs 152, in which the user identified by the user identified field 310, in the same entry, has requested that a cloud debug breakpoint represented by the respective entry be set. The instruction address field 314, in each entry, specifies a line, statement, offset, or address within the program 152 (specified by the program identifier field 312 in the same entry) at which the debugger 150 has set the cloud debug breakpoint represented by the respective entry. The swapped instruction field 316, in each entry, specifies the machine instruction that previously existed at the location specified by the instruction address field 314, in the same entry, prior to be cloud debug breakpoint represented by the respective entry being set. The debugger exit identifier 318, in each entry, specifies a program that the operating system 158 calls in response to the cloud debug breakpoint at the instruction address 314 being encountered by execution of the program 152 identified by the program identifier 312, in the same entry. The debugger exit identified by the debugger exit identifier field 318 calls or invokes a debugger 150. In another embodiment, the debugger exit identifier field 318 identifies a debugger 150 directly.

FIG. 4 depicts a block diagram of an example data structure for a program table 160, according to an embodiment of the invention. The program table 160 comprises entries, such as the example entries 402, 404, 406, and 408 each of which comprises a user identifier (ID) field 410, a program identifier (ID) field 412, and a server identifier (ID) field 414. The user identifier field 410, in each entry, specifies a user who has requested, via a request from the client computer system 132 to the cloud scheduler 154, that a program 152, identified by the program identifier 412 in the same entry, be executed at the server, identified by the server identifier 414, in the same entry. Various users may request execution of the same or different programs at the same or different servers. Further, the same program may execute on the same server at the request of different users, some of which have set a cloud debug breakpoints in the program while others have not. That is, some users may have assigned cloud debug breakpoints in the program while other users request that the program be executed, but do not have assigned cloud debug breakpoints in the program. In various embodiments, the same program at the same server, at the request of different users, may execute in the same or different memory space.

Figure 5:
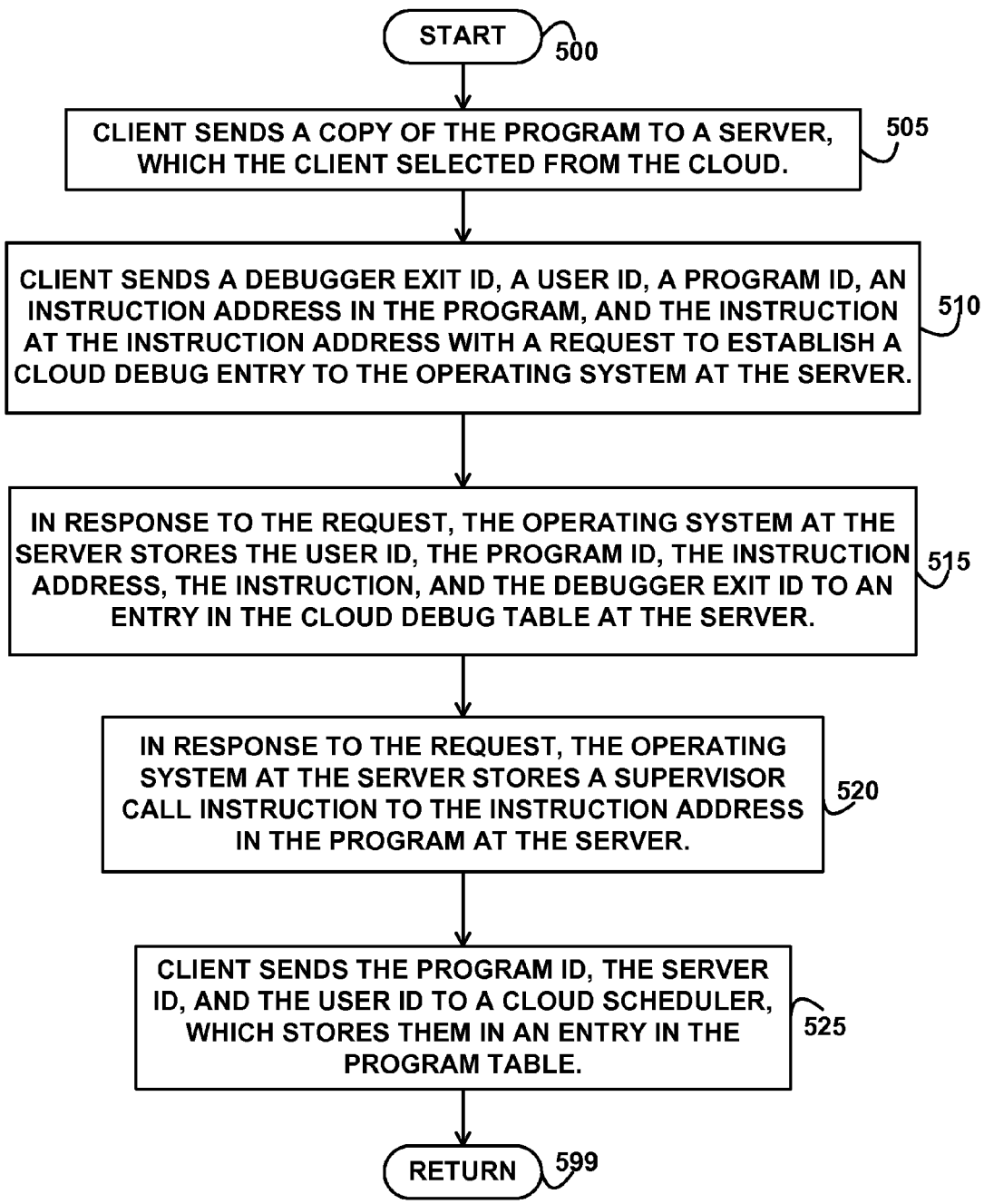
FIG. 5 depicts a flowchart of example processing for establishing a cloud debug breakpoint entry, according to an embodiment of the invention.

FIG. 5 depicts a flowchart of example processing for establishing a cloud debug breakpoint entry, according to an embodiment of the invention. Control begins at block 500. Control then continues to block 505, where the user via the client computer system 132 sends a copy of the program 152 to a server computer system 100 and requests that the server computer system 100 store the program 152 in memory or a storage device at the server computer system 100 and execute the program 152 in response to requests from the user. The server computer system 100 receives the program 152 and stores the program 152 in memory or a storage device at the server computer system 100. Control then continues to block 510 where the client computer system 132 sends a request that specifies a debugger exit identifier, a user identifier, a program identifier, an instruction address in the program 152, and the instruction at the instruction address in the program 152, to the same server computer system 100 to which the client sent the program 152. The request directs the operating system 158 at the server computer system 100 to establish a cloud debug breakpoint entry.

Control then continues to block 515 where the server computer system 100 receives the request. In response to the request, the operating system 158 at the server computer system 100 stores the user identifier, the program identifier, the instruction address, the instruction, and the debugger exit identifier to an entry in the cloud debug table 156 at the server. Control then continues to block 520 where, in response to the request, the operating system 158 at the server computer system 100 stores a supervisor call instruction or an invalid instruction to the instruction address in the program 152 at the server computer system 100. Copies of the program 152 that exist at the client or at other server computer systems do not contain the supervisor call instruction or invalid instruction at the instruction address.

Control then continues to block 525, where the user via the client computer system 132 sends the program identifier, the server identifier, and the user identifier to a cloud scheduler 154, which receives and stores them to an entry in the program table 160. In various embodiments, the cloud scheduler 154 may exist on the same or different server computer system 100 from the program 152. Control then continues to block 599, where the logic of FIG. 5 returns. Thus, the logic of FIG. 5 establishes a cloud debug breakpoint, assigned to a first user, in a program 152 at a server computer system 100, and the user selects the server computer system 100 at which the program 152 executes, from among the servers in the cloud 200.

Figure 6:
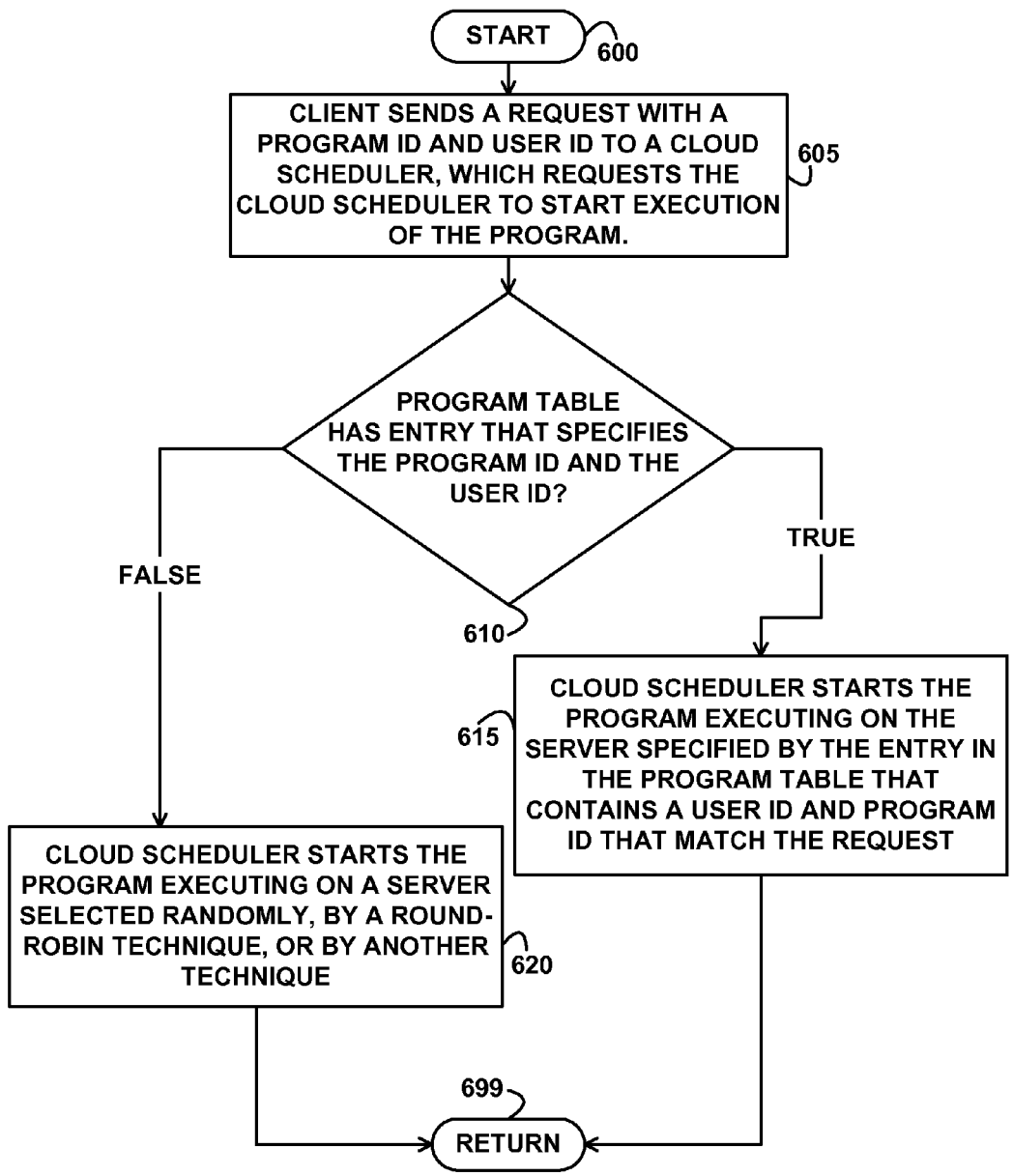
FIG. 6 depicts a flowchart of example processing for starting execution of a program on a server, according to an embodiment of the invention.

FIG. 6 depicts a flowchart of example processing for starting execution of a program on a server or for processing a request, according to an embodiment of the invention. Control begins at block 600. Control then continues to block 605, where the user via the client computer system 132 sends a request that specifies a program identifier and a user identifier to a cloud scheduler 154, which requests the cloud scheduler 154 to start execution of the specified program 152 identified by the program identifier on a processor 101 at a server computer system 100 or commands/instructs the cloud scheduler 154 to send the request to the program 152, which processes the request. The request may be a work request, a transaction, a query, a database operation, or any other type of request.

Control then continues to block 610, where the cloud scheduler 154 receives the request and, in response, determines whether the program table 160 contains an entry that specifies a program identifier and user identifier that match (are identical to) the received program identifier and user identifier.

If the determination at block 610 is true, then the program table 160 contains an entry that specifies a program identifier and user identifier that match the received program identifier and user identifier, so control continues to block 615 where the cloud scheduler 154 starts the program 152 executing on the server computer system 100 specified by the entry in the program table 160 that contains a user identifier and program identifier that match the user identifier and program identifier specified by request. Thus, all requests from a user whose identity matches the user identifier 410 specified by an entry in the program table 160 are sent to the server specified by the server identifier 414 in the same entry in the program table 160, and none of the requests from the user whose identity matches the user identifier 410 specified by an entry in the program table are sent to the program at any server other than the server specified by the server identifier 414, in the same entry. Control then continues to block 699 where the logic of FIG. 6 returns.

If the determination at block 610 is false, then the program table 160 does not contain an entry that specifies a program identifier and user identifier that match the received program identifier and user identifier, so control continues to block 620 where the cloud scheduler 154 starts the program 152 executing on a server computer system 100 selected randomly by the cloud scheduler 154, starts the program 152 executing on a server computer system 100 selected by a round-robin technique implemented by the cloud scheduler 154, starts the program 152 executing on a server computer system 100 with the smallest response time for requests, as compared to other server computer systems in the same cloud 200, or starts the program 152 executing on a server computer system 100 selected via another appropriate technique. Control then continues to block 699 where the logic of FIG. 6 returns.

In various embodiments, the logic of FIG. 6 may be executed multiple times, in order to process requests from multiple different clients, and to start execution of multiple different programs on multiple different servers or to process requests by multiple different programs on multiple different servers.

Figure 7:
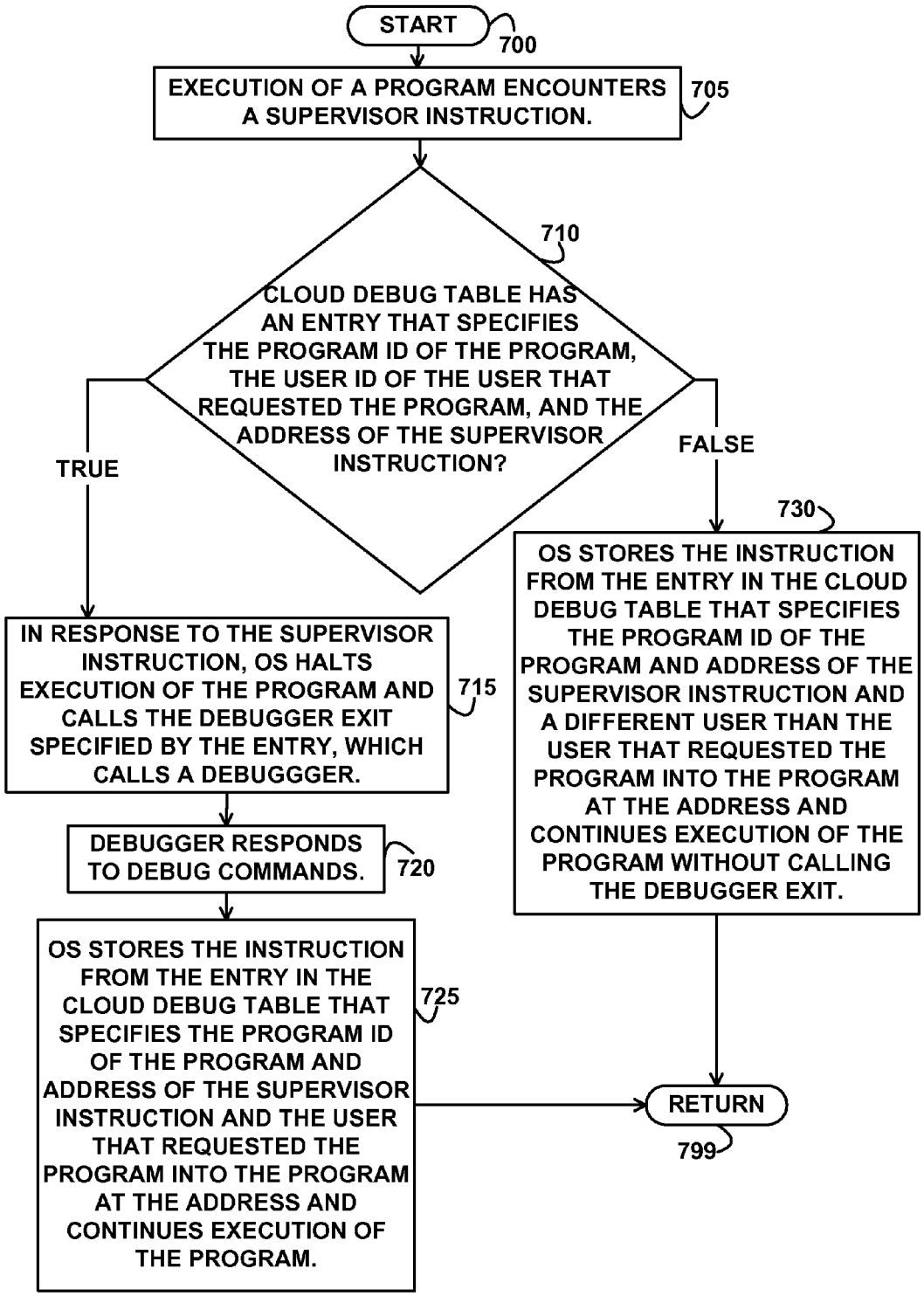
FIG. 7 depicts a flowchart of example processing for execution of a program encountering a cloud debug breakpoint, according to an embodiment of the invention.

FIG. 7 depicts a flowchart of example processing for execution of a program encountering a cloud debug breakpoint, according to an embodiment of the invention. Control begins at block 700. Control then continues to block 705 where the execution of a program 152 on a processor 101 encounters a supervisor instruction or an invalid instruction. The supervisor instruction or the invalid instruction causes a trap or interrupt to the operating system 158. In response to the trap or interrupt, control continues to block 710, where the operating system 158 determines whether the cloud debug table 156 contains an entry that specifies the program identifier of the program 152 that was executing and contains the supervisor or invalid instruction, the user identifier of the user that requested the program 152 be executed, and the address of the supervisor or invalid instruction in the executing program 152 that caused the trap or interrupt.

If the determination at block 710 is true, then the cloud debug table 156 contains an entry that specifies the program identifier of the program 152 that was executing, the user identifier of the user that requested the program 152 be executed, and the address of the supervisor instruction that caused the trap or interrupt, so control continues to block 715 where, in response to the supervisor instruction and determination, the operating system 158 halts execution of the program 152 at the invalid or supervisor instruction and calls the debugger exit specified by the entry, which calls a debugger 150 and gives that debugger 150 control of the processor 101 on which the halted program 152 was executing. Control then continues to block 720 where the debugger 150 receives debug commands from a user interface or application, processes the debug commands, and responds to debug commands. For example, the debugger 150 may receive debug commands that request the setting or removing of breakpoints, the reading of memory locations or registers, and/or the resuming execution of the program 152.

Control then continues to block 725 where, in response to a debug command that requests resuming execution of the program 152, the operating system 158 stores the swapped instruction 316 from the entry in the cloud debug table 156 that specifies the program identifier of the program 152 and address of the supervisor instruction and the user that requested the program 152 into the program 152 at the address of the supervisor or invalid instruction and continues execution of the program 152 on the processor 101, from the location of the invalid or supervisor instruction. Control then continues to block 799 where the logic of FIG. 7 returns.

If the determination at block 710 is false, then the cloud debug table 156 does not contain an entry that specifies the program identifier of the program 152 that was executing, the user identifier of the user that requested the program 152 be executed, and the address of the supervisor or invalid instruction that caused the trap or interrupt, so control continues to block 730 where the operating system 158 stores the swapped instruction 316 from the entry in the cloud debug table 156 (that specifies the program identifier of the program 152 and address of the supervisor or invalid instruction and specifies a different user than the user that requested that the cloud debug breakpoint be set into the program 152 at the address of the supervisor or invalid instruction) into the program 152 at the instruction address 314 of the supervisor/invalid instruction and continues execution of the program 152 without calling the debugger exit. Thus, a request from users other than the user assigned to the cloud debug breakpoint may issue a request that causes the execution of the program at the same server as the server to which the assigned user has requested the program to be executed, and the execution of the program caused by other users may encounter the cloud debug breakpoint. But, for the other users, the debugger exit is not called and execution of the program continues. Control then continues to block 799 where the logic of FIG. 7 returns.

In this way, in an embodiment, a user may set breakpoints in a program that executes in a cloud computing environment, without impacting other users.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, embodiments of the invention may be practiced without these specific details. In other instances, well-known circuits, structures, and techniques have not been shown in detail in order not to obscure embodiments of the invention.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure is not necessary. The previous detailed description is, therefore, not to be taken in a limiting sense.

What is claimed is:

1. A method comprising:

establishing a cloud debug breakpoint, assigned to a first user, in a program at a first server in a cloud, wherein the first user selects the first server at which the program executes, from among a plurality of servers in the cloud, wherein the cloud debug breakpoint is established by replacing an instruction in the program at a location of the cloud debug breakpoint with a triggering instruction;

executing the program at the plurality of servers in the cloud, in response to a plurality of requests from a plurality of users;

executing the program at the first server in the cloud, in response to all requests from the first user to the program, wherein the first user is a member of the plurality of users, and wherein the first server is a member of the plurality of servers in the cloud;
responsive to encountering the triggering instruction during execution of the program, triggering an operating system function which determines an identifier of a user that sent a request that the program was executing at a time that the triggering instruction was encountered;
if the identifier of the user that sent the request that the program was executing at a time that the triggering instruction was encountered matches an identifier of the first user assigned to the cloud debug breakpoint, halting the execution of the program and giving control of a processor on which the program executed to a debugger; and
if the identifier of the user that sent the request that the program was executing at a time that the triggering instruction was encountered does not match the identifier of the first user assigned to the cloud debug breakpoint, continuing execution of the program without giving control of the processor on which the program executes to the debugger.

2. The method of claim 1, further comprising:
in response to execution of the program at the first server reaching a supervisor instruction, comparing an address of the cloud debug breakpoint assigned to the first user to an address of the supervisor instruction in the program.

3. The method of claim 1, wherein the establishing the cloud debug breakpoint further comprises:
receiving, from the first user, a specification of an identifier of the debugger and an identifier of an instruction address in the program at which the first user instructs that the cloud debug breakpoint is to be set.

4. The method of claim 1, further comprising:
receiving, from the first user, a specification of an identifier of the program and the first server to which the first user instructs that all requests from the first user are to be sent.

5. The method of claim 1, wherein at least one of the plurality of requests from a plurality of users other than the first user causes execution of the program at the first server to encounter the cloud debug breakpoint.

6. A non-transitory computer-readable storage medium encoded with instructions, wherein the instructions when executed comprise:
establishing a cloud debug breakpoint, assigned to a first user, in a program at a first server in a cloud, wherein the first user selects the first server at which the program executes, from among a plurality of servers in the cloud, wherein the cloud debug breakpoint is established by replacing an instruction in the program at a location of the cloud debug breakpoint with a triggering instruction;
executing the program at the plurality of servers in the cloud, in response to a plurality of requests from a plurality of users;
executing the program at the first server in the cloud, in response to all requests from the first user to the program, wherein the first user is a member of the plurality of users, and wherein the first server is a member of the plurality of servers in the cloud;
responsive to encountering the triggering instruction during execution of the program, triggering an operating system function which determines an identifier of a user that sent a request that the program was executing at a time that the triggering instruction was encountered;
if the identifier of the user that sent the request that the program was executing at a time that the triggering instruction was encountered matches an identifier of the first user assigned to the cloud debug breakpoint, halting the execution of the program and giving control of a processor on which the program executed to a debugger; and
if the identifier of the user that sent the request that the program was executing at a time that the triggering instruction was encountered does not match the identifier of the first user assigned to the cloud debug breakpoint, continuing execution of the program without giving control of the processor on which the program executes to the debugger.

7. The non-transitory computer-readable storage medium of claim 6, further comprising:
in response to execution of the program at the first server reaching a supervisor instruction, comparing an address of the cloud debug breakpoint assigned to the first user to an address of the supervisor instruction in the program.

8. The non-transitory computer-readable storage medium of claim 6, wherein the establishing the cloud debug breakpoint further comprises:
receiving, from the first user, a specification of an identifier of the debugger and an identifier of an instruction address in the program at which the first user instructs that the cloud debug breakpoint is to be set.

9. The non-transitory computer-readable storage medium of claim 6, further comprising:
receiving, from the first user, a specification of an identifier of the program and the first server to which the first user instructs that all requests from the first user are to be sent.

10. The non-transitory computer-readable storage medium of claim 6, wherein at least one of the plurality of requests from a plurality of users other than the first user causes execution of the program at the first server to encounter the cloud debug breakpoint.

11. A computer system comprising:
a processor; and
memory communicatively coupled to the processor, wherein the memory is encoded within instructions, and wherein the instructions when executed on the processor comprise
establishing a cloud debug breakpoint, assigned to a first user, in a program at a first server in a cloud, wherein the first user selects the first server at which the program executes, from among a plurality of servers in the cloud, wherein the cloud debug breakpoint is established by replacing an instruction in the program at a location of the cloud debug breakpoint with a triggering instruction;
executing the program at the plurality of servers in the cloud, in response to a plurality of requests from a plurality of users;
executing the program at the first server in the cloud, in response to all requests from the first user to the program, wherein the first user is a member of the plurality of users, and wherein the first server is a member of the plurality of servers in the cloud;
responsive to encountering the triggering instruction during execution of the program, triggering an operating system function which determines an identifier of a user that sent a request that the program was executing at a time that the triggering instruction was encountered;
if the identifier of the user that sent the request that the program was executing at a time that the triggering instruction was encountered matches an identifier of the first user assigned to the cloud debug breakpoint, halting the execution of the program and giving control of a processor on which the program executed to a debugger; and if the identifier of the user that sent the request that the program was executing at a time that the triggering instruction was encountered does not match the identifier of the first user assigned to the cloud debug breakpoint, continuing execution of the program without giving control of the processor on which the program executes to the debugger.

12. The computer system of claim 11, wherein the instructions further comprise:
  in response to execution of the program at the first server reaching a supervisor instruction, comparing an address of the cloud debug breakpoint assigned to the first user to an address of the supervisor instruction in the program.

13. The computer system of claim 11, wherein the establishing the cloud debug breakpoint further comprises:
  receiving, from the first user, a specification of an identifier of the debugger and an identifier of an instruction address in the program at which the first user instructs that the cloud debug breakpoint is to be set.

14. The computer system of claim 11, wherein the instructions further comprise: receiving, from the first user, a specification of an identifier of the program and the first server to which the first user instructs that all requests from the first user are to be sent.

15. The computer system of claim 11, wherein at least one of the plurality of requests from a plurality of users other than the first user causes execution of the program at the first server to encounter the cloud debug breakpoint.

16. The computer system of claim 11, wherein the triggering instruction is one of: a supervisor instruction and an invalid instruction.

17. The method of claim 1, wherein the triggering instruction is one of: a supervisor instruction and an invalid instruction.

18. The non-transitory computer-readable storage medium of claim 6, wherein the triggering instruction is one of: a supervisor instruction and an invalid instruction.

* * * * *